United States Patent [19]

Kostiainen et al.

[11] Patent Number: 5,413,979
[45] Date of Patent: May 9, 1995

[54] METHOD FOR THE PREPARATION OF A CATALYST COMPONENT FOR THE POLYMERIZATION OF OLEFINS, A POLYMERIZATION CATALYST COMPONENT PRODUCED BY THE METHOD AND USE OF THE SAME

[75] Inventors: Arja Kostiainen; Bill Gustafsson; Pekka Sormunen, all of Porvoo, Finland

[73] Assignee: Borealis Holding A/S, Lyngby, Denmark

[21] Appl. No.: 856,967

[22] PCT Filed: Nov. 20, 1990

[86] PCT No.: PCT/FI90/00279

§ 371 Date: Jun. 16, 1992

§ 102(e) Date: Jun. 16, 1992

[87] PCT Pub. No.: WO91/07443

PCT Pub. Date: May 30, 1991

[30] Foreign Application Priority Data

Nov. 20, 1989 [FI] Finland ............................. 895526

[51] Int. Cl.⁶ .............................................. B01J 31/00
[52] U.S. Cl. ....................................... 502/107; 502/104; 502/116; 502/117; 502/118; 502/119; 502/120; 502/124
[58] Field of Search ................ 502/104, 107, 116, 117, 502/118, 119, 120, 124

[56] References Cited

U.S. PATENT DOCUMENTS

| | | | |
|---|---|---|---|
| 4,124,532 | 11/1978 | Giannini et al. | 252/429 |
| 4,174,429 | 11/1979 | Giannini et al. | 526/114 |
| 4,277,589 | 7/1981 | Giannini et al. | 526/122 |
| 4,302,566 | 11/1981 | Karol et al. | 526/125 |
| 4,349,648 | 9/1982 | Jorgensen et al. | 526/125 |
| 4,354,009 | 10/1982 | Goeke et al. | 526/125 |
| 4,359,561 | 11/1982 | Fraser et al. | 526/88 |
| 4,374,753 | 2/1983 | Pullukat et al. | 252/429 |
| 4,383,095 | 5/1983 | Goeke et al. | 526/88 |
| 4,467,044 | 8/1984 | Band | 502/111 |
| 4,478,988 | 10/1984 | Pullukat et al. | 526/128 |
| 4,482,687 | 11/1984 | Noshay et al. | 526/125 |
| 4,524,141 | 6/1985 | Pullukat et al. | 502/107 |
| 4,567,243 | 1/1986 | Pullukat et al. | 526/128 |
| 4,670,526 | 6/1987 | Cann et al. | 526/125 |
| 4,732,882 | 3/1988 | Allen et al. | 502/104 |
| 4,950,631 | 8/1990 | Buehler et al. | 502/119 |

FOREIGN PATENT DOCUMENTS

| | | |
|---|---|---|
| 267794 | 5/1988 | European Pat. Off. . |
| 296561 | 12/1988 | European Pat. Off. . |
| 78113 | 2/1989 | Finland . |
| 3100972 | 3/1982 | Germany . |
| 3228065 | 2/1983 | Germany . |

OTHER PUBLICATIONS

Linsen (editor) Physical and Chemical Aspects of Adsorbents and Catalysts; p. 236. (1970).

*Primary Examiner*—Helen M. S. Sneed
*Assistant Examiner*—E. D. Irzinski
*Attorney, Agent, or Firm*—Foley & Lardner

[57] ABSTRACT

The invention relates to a method for the preparation of a solid procatalyst composition for a catalyst system intended for the polymerization of olefins, wherein a magnesium halide, such as magnesium chloride, is dissolved and/or slurried in a mono-carboxylic acid alkyl ester, such as ethyl acetate, is impregnated into a support material, dried, treated with an organometallic compound or a silicon compound and thereafter with a transition metal compound. The invention also relates to such a procatalyst composition and its use together with a cocatalyst for the polymerization of olefins. According to the invention it has been possible to increase the activity of the catalyst composition by using a silanated support material, such as silanated silica, which is then treated with an organometallic or silicon compound before treatment with a transition metal compound. The silanated silica is preferably a silicon dioxide which has been heat-treated at 1000°–200° and thereafter treated with hexamethyldisilazane and contains 3–6% carbon. The organometallic compound is preferably an aluminum alkyl compound, such as triethylaluminum, and the transition metal compound is preferably titanium tetrachloride.

11 Claims, No Drawings

METHOD FOR THE PREPARATION OF A CATALYST COMPONENT FOR THE POLYMERIZATION OF OLEFINS, A POLYMERIZATION CATALYST COMPONENT PRODUCED BY THE METHOD AND USE OF THE SAME

The invention relates to a method for the preparation of a solid procatalyst composition for a catalyst system intended for the polymerization of olefins, method in which support material is impregnated with magnesium halide and a monocarboxylic acid alkyl ester which dissolves the halide, and the impregnated support material is reacted with an organometallic compound or a silicon compound and treated with a transition metal compound.

For the polymerization of olefins there is commonly used the so-called Ziegler-Natta catalyst system, which comprises a so-called procatalyst and a cocatalyst. The procatalyst is based on a compound of a transition metal belonging to any of Groups IVB-VIII of the periodic table of the elements, and the cocatalyst is based on an organometallic compound of a metal belonging to any of Groups IA-IIIA of the periodic table of the elements.

In the preparation of heterogeneous polymerization catalysts it is conventional to use as a component improving the polymerization activity of procatalysts a support compound on which the transition metal compound is deposited. Silica, aluminum oxide, magnesium oxide, titanium oxide, carbon in various forms, and various types of polymers are common support compounds. Compounds which have proven to be important support compounds include magnesium compounds such as alkoxides, hydroxides, hydroxy halides and halides, of which the last-mentioned, specifically magnesium dichloride, have recently become the most important support components for procatalyst compositions.

Since magnesium halides in their basic crystal form are not very effectively activated by a transition metal compound, their crystal structure has to be deformed. Conventionally this is done by milling, for example in a ball mill, the result obtained being typically a finely-divided powder with a large specific surface area and with highly deformed crystal lattices of the particles. When such a powder is activated to form a procatalyst composition by deposition with a transition metal compound, and is thereafter reduced with an organometallic compound serving as the cocatalyst, a highly active polymerization catalyst is obtained.

The conventional method of milling magnesium halide has, however, the disadvantage that it consumes a very large amount of energy, causes wear and corrosion of the apparatus, and is usable for the preparation of a catalyst only by a cumbersome batch process.

A more novel and more efficient method of decreasing the crystallinity of magnesium halides, and thereby of increasing their ability to become activated by transition metal compounds, is chemical modification. Therein the magnesium halide, an electron donor, and a transition metal compound are caused, often in a solution, to react with each other to form easily separable procatalyst compositions. U.S. Pat. Nos. 4,124,532 and 4,174,429 describe the preparation of such catalytically active complexes by reacting at a suitable ratio a magnesium halide and a transition metal compound in an electron donor solvent. The completed complex can be separated by evaporation crystallization of the said solvent or by doping the complex with a solvent in which it does not dissolve. Since such complex compounds are produced as a result of spontaneous crystallization, their crystal structure is very regular and their activity respectively quite limited. U.S. Pat. Nos. 4,302,566 and EP Application 6110 describe a precursor comprising a magnesium halide, a transition metal compound, and an electron donor. The precursor is formed by precipitation out of an electron donor solution, whereafter it is separated and mixed with an aluminum alkyl which activates it and with a separate inert support material.

Even in these methods there is not formed a substantially amorphous procatalyst composition, since the said precursor crystallizes spontaneously in the preparation process and will thereafter not substantially change its morphology.

Other patents describe Ziegler-Natta procatalysts on a silica support or a magnesium silicate support, but in them the superior ability of magnesium compounds to activate transition metal compounds has not been exploited. Such patents include: WO 8 802 376, EP 215916, EP 120503, EP 91135, EP 80052, EP 55605, EP 43220, EP 20818, U.S. Pat. No. 4,482,687, U.S. Pat. No. 4,383,095, U.S. pat. No. 4,354,009, U.S. Pat. Nos. 4,349,648, and 4,359,561.

U.S. Pat. No. 4,670,526 describes a catalyst activation process in which a divalent magnesium halide together with a Lewis acid, e.g. ethylaluminum chloride, is dissolved in an excess of an electron donor, and the obtained complex is separated from the excess of the electron donor before a treatment with a titanium or vanadium compound. The complex is alternatively also deposited on silica.

EP Application 267 794A2 describes a catalyst system which is prepared by combining silica or alumina with a magnesium halide and an organometallic compound. Typically this combining is done by dissolving the magnesium halide in an inert solvent; ethyl acetate is also mentioned as one of these. As regards silica, it is noted that it may contain small amounts of water, although in the embodiment examples the silica is calcined. Before the treatment with a transition metal compound the catalyst component is, according to the embodiment examples, treated with an electron donor, e.g. vinyl ethoxysilane and triphenyl phosphite, presumably in order to increase the isotacticity of the polypropylene to be polymerized with the catalyst.

The object of the present invention is to provide a procatalyst composition comprising a support material, a magnesium halide, an organometallic or silicon compound, and a transition metal compound, and having a structure which is maximally amorphous and thus maximally active catalytically. The invention also aims at a method for the preparation of a solid procatalyst composition for a catalyst system intended for the polymerization of olefins, method which does not require a separate step of milling the magnesium halide and in which the treatment with the transition metal compound takes place at so late a preparation stage that recrystallization of the product and loss of activity will no longer occur during its complexing. The invention further aims at finding for the novel procatalyst composition as appropriate use as possible in the polymerization or copolymerization of olefins, and in particular α-olefins.

According to the invention, these objects have been achieved by a method, a procatalyst and the use of the same the characteristics of which are given in the independent claims in the accompanying patent claims.

The invention is thus based on the realization that the change in the morphology of the magnesium halide which is a prerequisite for activity is produced by impregnating a separate, inert silanated support material with a magnesium halide and with a monocarboxylic acid alkyl ester which dissolves the halide. When, after the drying of the solvent, the impregnated separate silanated support material is reacted with an organometallic compound, such as an organometallic compound of a metal belonging to any of Groups IA–IIIA, preferably an aluminumalkyl compound, or with a silicon compound, preferably a halide or alkyl halide compound, the result is a solid silanated support material coated with a magnesium halide, and the support is ultimately treated with a transition metal compound. One useful feature of the invention lies in that the treatment with the transition metal compound takes place later than in the conventional homogeneous activation processes of a procatalyst composition; consequently, the recrystallization of the procatalyst composition is prohibited and the activity of the mixture is thus retained.

The preparation of the solid procatalyst composition for a catalyst system intended for the polymerization of olefins thus starts with the dissolving or slurrying of an anhydrous magnesium halide in a suitable monocarboxylic acid alkyl ester, which serves as the solvent. By the magnesium halide used is meant specifically a magnesium halide in which the halogen is chlorine, bromine, iodine, or a mixture of the same. The most preferred magnesium halide is an anhydrous and dry magnesium dichloride $MgCl_2$. The ester used as the solvent is under the process conditions a liquid in which the magnesium compound is partly, or preferably completely, soluble. It is preferably an alkyl ester of an aliphatic carboxylic acid which contains 1–10 carbon atoms, and quite particularly ethyl acetate. The dissolving of magnesium halide in the ester serving as the solvent is done, when necessary, with the help of agitation at an elevated temperature.

In the next step, the obtained magnesium halide solution is used for impregnating a separate silanated support material. An alternative method of depositing the magnesium halide on the support is to add the magnesium halide and the solvent simultaneously with the support to form a slurry from which the magnesium halide, upon dissolving, will at least in the main deposit on the surface of the support.

The inert support is preferably silica, an inorganic oxide of silicon. The particle size of the silica is 10–200 μm, preferably 40–150 μm. It is preferably selected to that its particle size distribution is as narrow as possible. In addition, these supports are porous and their surface area is preferably over 100 $m^2/g$ and voids volume over 1 $cm^3/g$. Untreated silica contains water, which can be removed by a heat treatment, for example at 100°–200°0 C., or for example by distilling the water azeotropically by means of heptane, or by reacting with an excess of a silanating reagent. Even if the water present in the silica is removed, the silica will still contain a large quantity of hydroxyl groups. These groups can be removed in many ways. A commonly used method is to eliminate them by calcination, i.e. by heating in a kiln to a temperature above 200° C., usually in the presence of a nitrogen flow or in dry air. The method is effective but time-consuming. Especially the kilns required for the treatment of large quantities of silica will be very expensive owing to the special requirements due to the high temperatures. Therefore it is preferable to use a method in which separate calcination is avoided, although the silica can, of course, be calcined before the silanation if it is desired, for example, to decrease the amount of the silanating reagent.

In the present invention it has been observed that by using silanated silica as the initial material the disadvantages of kiln drying and calcination can be avoided, and at the same time better results can be achieved in terms of the properties of the catalyst. By silanating the silica the hydroxyl groups can be decreased chemically. The silanation can be carried out in the same reactor as the other steps of the catalyst preparation, whereby separate kiln treatments and transfers of the silica are avoided.

Before the silanation the water present in the silica can be removed by heating it to a temperature of 100°–200°C., preferably by using a gas flow, for example nitrogen. On a laboratory scale this step can be carried out conveniently even separately in a kiln, because in the case of small material quantities and low temperatures this is done with very simple apparatus. Another method of removing the water is to distill the water azeotropically, for example with the help of heptane. This is advantageous especially when large amounts of material are involved. The remaining water and a portion of the hydroxyl groups are next removed by silanation, in which an organic silicon compound which reacts with the hydroxy groups is added to a slurry of the silica and a suitable hydrocarbon, e.g. heptane. On the other hand, it is also possible that the silanation reagent is used in so large a quantity that no heat treatment for the removal of water is necessary.

The said organic silicon compounds are preferably compounds according to formula $R_mSiX_{4-m}$, $R_nSi(OR)_{4-n}$ or $(R_3Si)_2NH$. R is an alkyl group or aryl group having 1–10 carbon atoms, X is a halogen atom such as Cl or Br, m=1, 2 or 3, n=0, 1, 2, 3 or 4. Hexamethyldisilazane (HMDS) is especially preferred.

The silanation treatment is carried out by adding, for example, HMDS at 5–25% to a hydrocarbon slurry of silica, by agitating for example for 0.5–2 hours, and by drying the slurry to produce a freely flowing powder. The amount of HMDS is dependent on the pre-treatment of the silica and on its water content. However, the amount is not exact, since excess HMDS is removed during the drying. Also other silanation methods known and clear to an expert in the art can be used. The silanation can, of course, also be carried out on a large batch at the same time, from which the desired quantity can be batched for further treatment.

On the basis of a carbon analysis, a silica thus treated typically contains carbon 3–6% by weight.

After the silanated support has been impregnated with a magnesium halide solution or slurry, this being carried out, when necessary, at an elevated temperature, the solvents are evaporated dry, and then the impregnated support is reacted by treating it with an organometallic compound of any metal belonging to Groups IA–IIIA, preferably with an aluminum alkyl compound or a silicon compound, preferably chloride or alkyl chloride. The product obtained after this treatment can be washed in order to remove the dissolved reaction products, but washing is not necessary.

The treatment with a transition metal compound is preferably carried out by preparing of the above-mentioned impregnated and dried support particles a hydrocarbon slurry to which the transition metal is added, or by adding it directly to the solution after the previous treatment. This treatment can be sped up by using agitation and an elevated temperature. The transition metal compound is preferably a halogen-containing compound of titanium, vanadium, and/or zirconium. Titanium compounds are especially preferred, and titanium tetrachloride $TiCl_4$ is the most preferred.

The procatalyst composition obtained after the transition metal treatment is washed, dried and analyzed. The washing steps are not necessary; good results have been obtained even when the solvent has merely been evaporated off or when the procatalyst has been left in the form of a slurry.

In experiments carried out in connection with the invention it was observed surprisingly that the performance of the catalyst prepared in the manner described above was excellent, specifically with silanated silica, and that it was especially well applicable to the polymerization of ethylene, with a high activity and a high hydrogen and comonomer sensitivity. The polymer obtained has a narrow molecular weight distribution (MWD) and a good morphology for various uses.

EXAMPLE 1

10 g of untreated silica (EP 17MS, Crosfield Chemicals) was slurried in 120 ml of heptane in a glass flask. The mixture was heated in a bath to a temperature of 110° C., and water was distilled off azeotropically. Initially the distillate was turbid owing to the water present in the heptane, but gradually the distillate cleared up as the water decreased. Approx. 80 ml of the distillate was collected. 2.26 ml of hexamethyldisilazane (HMDS) was added to the slurry, and the mixture was boiled for approx. 1.5 hours.

Ultimately the silanated silica was dried to form a dry powder, by using a nitrogen flow at 110° C. On the basis of a carbon analysis, the silanated silica contained carbon 3.34% by weight.

2.5 g of the silanated silica prepared in the abovementioned manner was placed in a flask. On top of the silica there was added a solution which had been obtained by dissolving 0.75 g of anhydrous $MgCl_2$ in 35 ml of dried ethyl acetate (EA) for 2 hours at a temperature of 80° C. The mixture was agitated at 80° C. for one hour and was dried to produce a freely flowing powder.

Next, the obtained impregnated support was re-slurried in 25 ml of dry heptane, 3.5 ml of a 10 wt. % solution of triethylaluminum in pentane was added, and the mixture was agitated for one hour at 40° C. Next, 0.32 ml of $TiCl_4$ was added on top of the solution, was agitated for 2 hours at 60° C., and dried in a nitrogen flow at 100° C. 3.6 g of a procatalyst composition was obtained. According to an analysis, the obtained procatalyst composition contained Mg 4.8% by weight, Ti 4.0%, Al 1.5%, Cl 24.4%, and EA 9.5%. The results of the test polymerization are shown in Table 1.

EXAMPLE 2

2.5 g of silica (Davison 955l) which had been dried for 4 hours at 180° C. in a glass tube while directing nitrogen via the tube was slurried in pentane, and 0.75 ml of hexamethyldisilazane (HMDS) was added. The mixture was agitated for one hour at 50° C. and dried with a nitrogen flow. On top of the treated silica was added a solution which had been obtained by dissolving 0.75 g of anhydrous $MgCl_2$ in 33 ml of ethyl acetate (EA) dried on molecular screens. The mixture was agitated for 5 hours at 80° C. and dried. The obtained product was re-slurried in pentane, and 20.5 ml of a 10% solution of triethylaluminum (TEA) in pentane was added. The mixture was agitated for an hour at 40° C., the solution was siphoned off, and the product was washed twice with pentane. Then 20 ml of pentane and 0.3 ml of $TiCl_4$ were added, the mixture was agitated for 2 hours at 50° C. and dried. 1.45 g of a procatalyst composition was obtained which contained Mg 4.1% by weight, Ti 4.1%, Al 1.2% and EA 5.3%.

EXAMPLE 3

2.0 g of silica (Davison 955, calcined at 600° C.) was slurried in pentane and treated with 0.26 ml of HMDS for one hour at 50° C. and dried. 15 ml of ethyl acetate and 0.2 g of anhydrous $MgCl_2$ were added on top of the silanated silica, and the mixture was agitated overnight at 80° C. After drying, 20 ml of pentane and 2.07 ml of a 10% solution of TEA were added, the mixture was agitated for one hour at 40° C., and the solution was siphoned off. The product was re-slurried in pentane, and 0.2 ml of $TiCl_4$ was added, whereafter the mixture was agitated for 2 hours at 50° C., and the obtained procatalyst composition was dried. 1.3 g of a product was obtained which contained Mg 1.7% by weight, Ti 4.6%, Al 2.0%, and Cl 19.0%, as well as EA 8.4%.

EXAMPLE 4

The procedure was as in the preceding example, but only 0.077 ml of $TiCl_4$ was added. The procatalyst composition now contained only 1.9% Ti.

Test polymerization

The test polymerization of ethylene was carried out in each example in the following manner: into a 3-liter autoclave there was batched 1.8 l of isobutane which had been purified with removers of oxygen and moisture. 40–80 mg of procatalyst composition was fed in together with aluminum alkyl (TEA, Al/Ti=50–75). The temperature was raised to 90° C. An 0.5-liter pressure vessel, or a bomb, was pressurized to 5 bar with hydrogen, and hydrogen was fed into the reactor together with ethylene until the total pressure was 28 bar. Polymerization was carried out for one hour and the total pressure was maintained constant by means of ethylene feeding.

Copolymerization was carried out in a corresponding manner by adding 180 g of 1-butene before the feeding in of ethylene.

TABLE 1

| | Polymerization results | | | | | |
|---|---|---|---|---|---|---|
| Example | Activity g PE/g cat | g PE/g Ti | MI (21.6) | MI (2.16) | MFR (21/2) | BD |
| 1 | 12100 | 302500 | 18.3 | 0.59 | 30.9 | 0.39 |
| 2 | 10350 | 260000 | 54.9 | 1.71 | 32.1 | 0.34 |
| 3 | 8150 | 177000 | 12.7 | 0.40 | 32.0 | 0.30 |
| 4 | 5440 | 286000 | 9.70 | 0.32 | 30.6 | 0.29 |
| 4* | 7110 | 374000 | 62.9 | 2.50 | 25.2 | 0.31 |

MI: Melt Index, ASTM D 1238, condition 190° C./21.6 kg and 2.16 kg.
MFR: Melt Flow Ratio, melt indices 21.6 and 2.16 kg
BD: Bulk Density, g/ml
*copolymerization with 1-butene

We claim:

1. A method for the preparation of a solid procatalyst composition for a catalyst system intended for the polymerization of olefins, comprising the steps of:
   (i) silanating a support material with an organic silicon compound;
   (ii) subjecting the resulting silanated support material to an impregnation treatment with a magnesium halide and a monocarboxylic acid alkyl ester which dissolves or disperses said halide;
   (iii) reacting the impregnated support material with an organometallic compound of a metal of Group IA–IIIA or a silicon compound selected from the group consisting of halide silicon compounds and alkyl halide silicon compounds; and
   (iv) treating said support material with a transition metal compound.

2. A method according to claim 1, wherein said organic silicon compound of step (i) is hexamethyldisilazane.

3. A method according to claim 1, wherein said support material is silica.

4. A method according to claim 1, wherein, before the silanation step, a support material which contains hydroxyl groups is kept a temperature below about 200° C., whereby said hydroxyl groups are retained to a substantial degree in said support material until said silanation step.

5. A method according to claim 4, wherein a support material which contains water is heat-treated before the silanation step at a temperature of about 100°–200° C., whereby the water is removed from said support material but a considerable quantity of hydroxyl groups are retained in it.

6. A method according to claim 1, wherein said support material is calcined before the silanation step.

7. A method according to claim 1, wherein said magnesium halide is dissolved or slurried in said ester, and said support material is impregnated with the obtained solution or slurry.

8. A method according to claim 1, wherein said magnesium halide is anhydrous magnesium chloride and wherein said monocarboxylic acid alkyl ester is ethyl acetate.

9. A method according to claim 1, wherein said impregnated support material is reacted in step (iii) with an aluminum alkyl compound and is treated in step (iv) with a titanium halogen compound.

10. A method according to claim 9, wherein said aluminum alkyl compound of step (iii) is triethylaluminum and said titanium halogen compound of step (iv) is titanium tetrachloride.

11. A solid procatalyst composition for a catalyst system intended for the polymerization of olefins, prepared by the method according to any one of claims 1–9 or 10.

* * * * *